United States Patent [19]
Jackson

[11] 3,948,779
[45] Apr. 6, 1976

[54] DISC FILTER
[76] Inventor: Clifford E. Jackson, 10 Brant St. E., Orillia, Ontario, Canada
[22] Filed: Aug. 9, 1974
[21] Appl. No.: 496,266

Related U.S. Application Data
[63] Continuation of Ser. No. 319,304, Dec. 29, 1972, abandoned.

[52] U.S. Cl. ............... 210/331; 210/347; 210/391; 210/487
[51] Int. Cl.² ........................................ B01D 33/06
[58] Field of Search .......... 210/331, 347, 391, 402, 210/404, 406, 409, 410, 418, 486, 487, 489, 493, 494

[56] References Cited
UNITED STATES PATENTS
2,722,315  11/1955  Hapman .............................. 210/402
3,261,474  7/1966  Parker et al. ........................ 210/487
3,283,906  11/1966  Crane et al. ..................... 210/486 X
3,302,796  2/1967  Downey .............................. 210/487
3,358,843  12/1967  Bourdale ............................ 210/487
3,606,735  9/1971  Baigas, Jr. ....................... 210/404 X Primary Examiner—Thomas G. Wyse
Assistant Examiner—Robert H. Spitzer
Attorney, Agent, or Firm—Westell & Hanley

[57] ABSTRACT

A disc filter is provided with undulating filter material formed by ridges and grooves extending radially and alternating circumferentially to increase the effective area of the filter.

1 Claim, 10 Drawing Figures

DISC FILTER

This is a continuation of application Ser. No. 319,304, filed Dec. 29, 1972, now abandoned.

This invention relates to rotary vacuum disc filters which comprise an approximately circular disc which is rotated about its axis of revolution which axis is, at least, approximately, horizontal. The disc rotates up to a predetermined depth which may be measured radially inward from its lowest point in the mixture of solid and liquid to be filtered. The disc is provided on its opposed sides with filter material, with the disc designed and the filter media arranged so that liquid can enter the space or chamber between the sides of the disc from the mixture, substantially only through the filter material. Sub-atmospheric pressure created in the chamber between the filter material in a pipe submerged in the filtrate, removes the filtrate. The filter cake thus created on the outside of the filter material and resulting from filtration, is detached from time to time, usually by a cyclically applied air blow.

In prior arrangements, the filter material or cloth has been supported on each side of the disc in a planar arrangement, so that the filter comprised two narrowly spaced, substantially circular planar sides carrying filter material on the radially outer portion thereof. Such radially outer portion is designed for submersion in a mixture of liquids and solids to be filtered. Means are provided for extracting the filtrate passing through each of the sides, by the action of sub-atmospheric pressure, created between the spaced layers of filter material.

It has been found that the filtering area of a disc filter may be increased by shaping the filter material on each side of the disc to provide alternate, approximately radially extending, ridges and valleys, facing the liquid and solid mixture to be filtered. The resulting undulations increase the filter area on each side and the increase of effective filter area increases the capacity of the filter and this has been indicated to be between 50 and 150 percent. The increase for a given application of the invention be it: the mining field, the pulp and paper field, or another field; depends on many factors, including the diameter of the disc, the size of the sectors into which the generally circular disc is divided, the size of the disc, spacing of the filter sides, etc.

In general, the invention comprises a filter design which provides undulations in the filter material of a disc filter, defined by radially extending ridges and valleys alternating circumferentially about the filter. The invention therefore, includes such variants as: filters wherein the slope from ridges to valleys measured, travelling in a circle about the filter axis, approaches constancy in the radial direction so that the undulations tend to become shallower toward the inside of the disc; also filters wherein the axial displacement from peaks to valleys tends toward constancy, so that the undulations become steeper toward the radially inward end of the filter, and also filters wherein undulations are only provided on the radially outer portion where the area increase provided by the undulations will have its most pronounced effect.

In all forms of the invention it will be almost certain that the undulations will stop short of the centre of the filter where at the disc is mounted on the shaft. In all forms it will be almost certain that the disc will comprise a plurality of sectors, each encompassing a predetermined angle of the generally circular disc filter, and where the sectors assembled together and to the hub make up its generally circular form.

Each sector therefore, will include means for mounting the filter material on each side thereof, means for creating the alternating ridges and valleys over the angle encompassing the sector, means for assembling the sector to the hub and to the other sectors, and means for removing from the inside of the sector, the filtrate, by sub-atmospheric pressure drawing such filtrate into a conduit.

In the drawings which illustrate a preferred embodiment of the invention:

Figure 1:
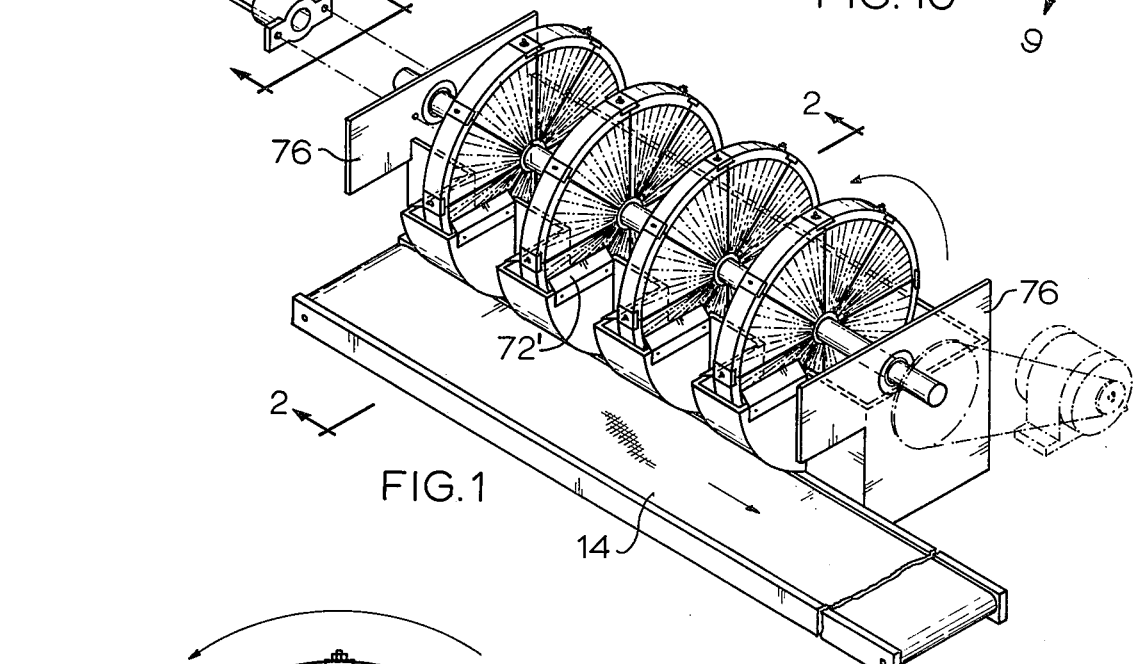
FIG. 1 shows a typical arrangement of a four disc filter, wherein the filter is in accord with the invention.
Figure 2:
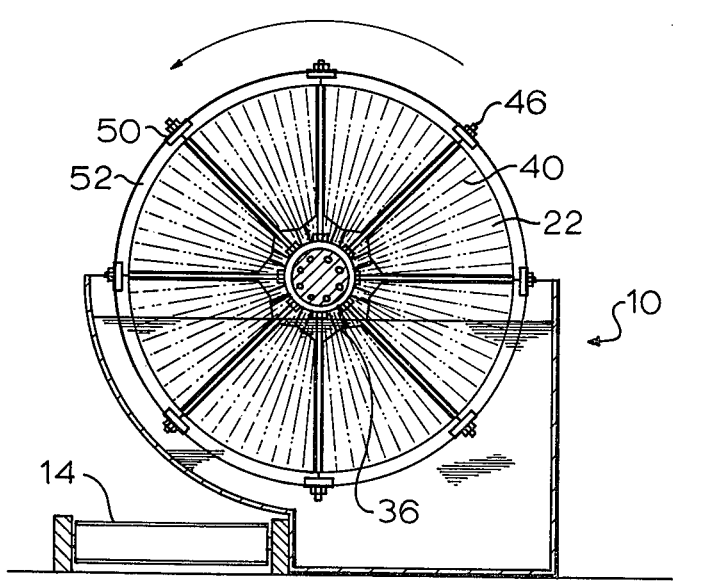
FIG. 2 shows an end view of the filter arrangement.
Figure 4:
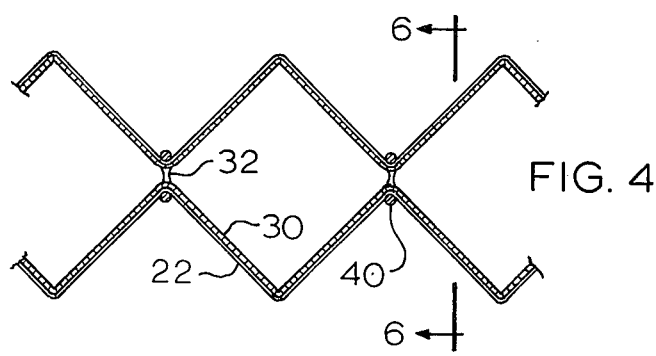
FIG. 4 shows a cross-section along the lines 4—4 of FIG. 3.
Figure 5:
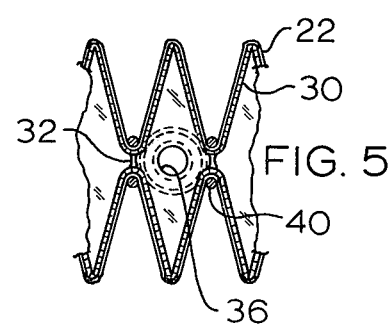
FIG. 5 shows a cross-section along the lines 5—5 of FIG. 3.
Figure 6:
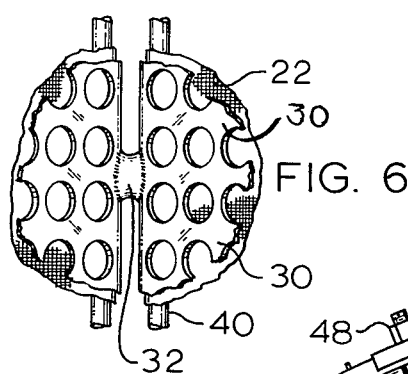
FIG. 6 shows an enlargement of a portion of the filter arrangement viewed along the lines 6—6 of FIG. 4.
Figure 3:
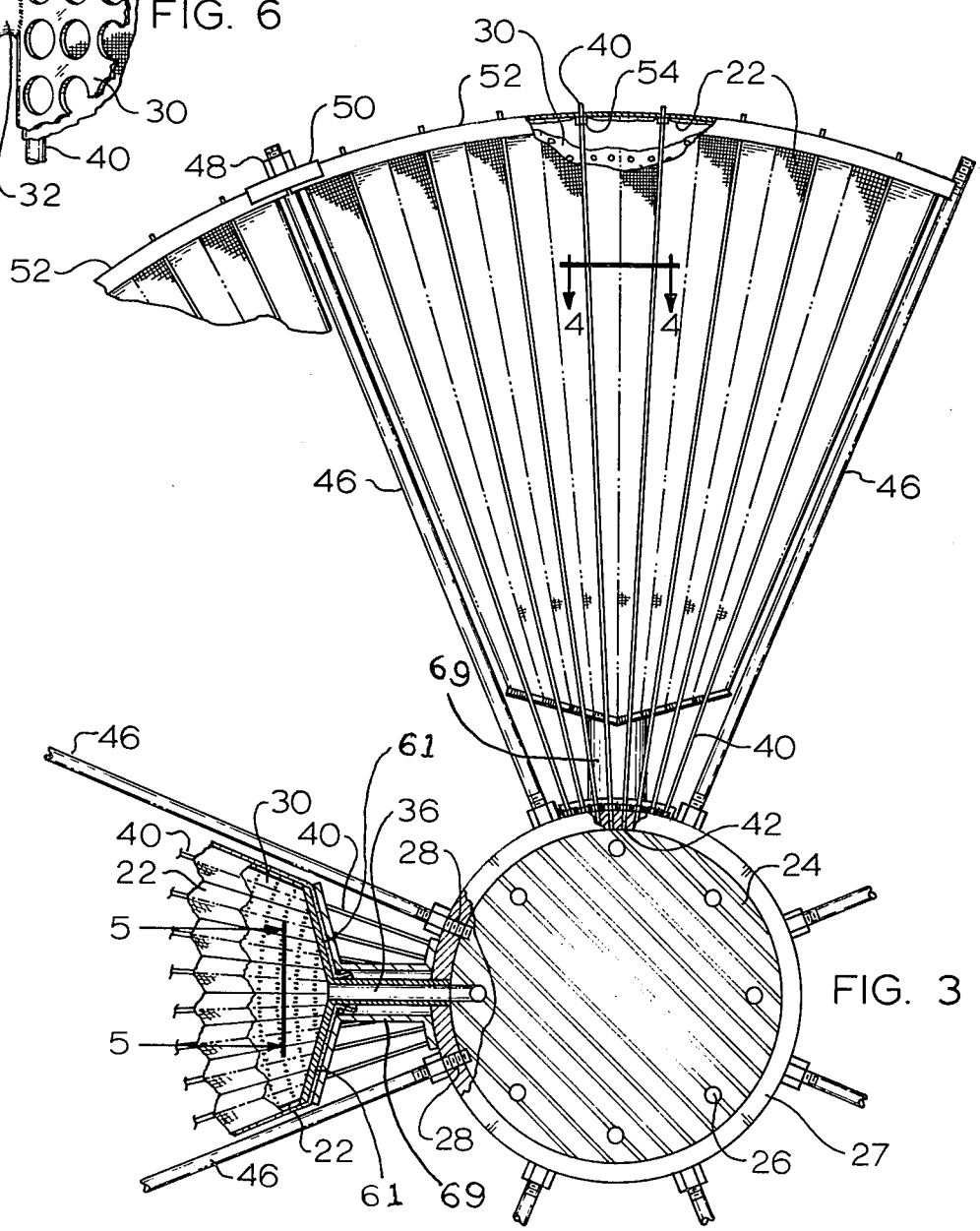
FIG. 3 shows a portion of the inventive filter in end view.
Figure 7:
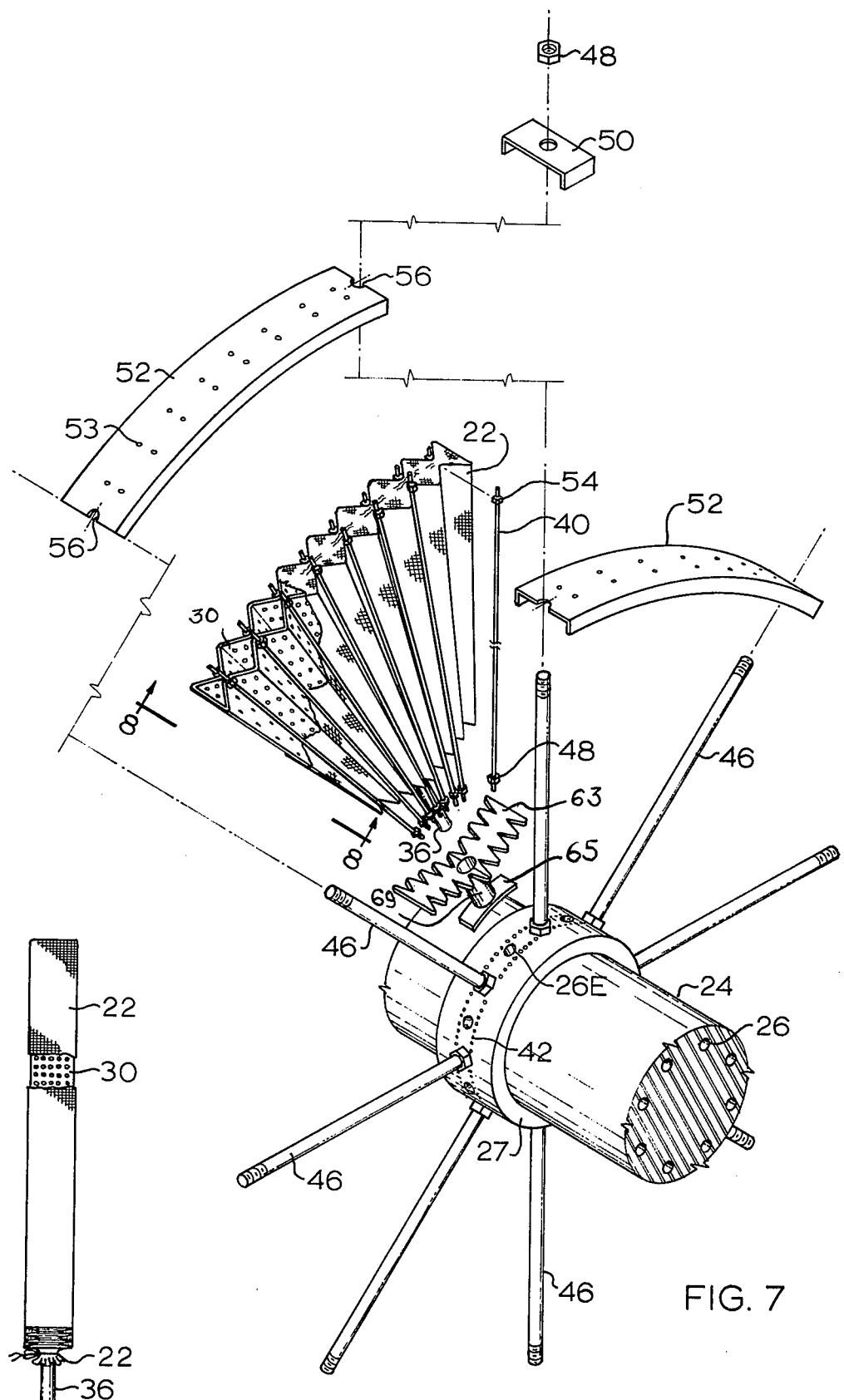
FIGS. 7 and 8 show a detail view of the arrangement of the filter media.

As shown in FIG. 1, a disc filter arrangement customarily comprises a plurality of discs arranged for rotation on a common shaft. As shown in FIGS. 1 and 2, the discs which are each narrow in an axial direction and wide in a radial direction rotate substantially up to the hub in a tank 10 containing the liquid-solid mixture to be filtered. As shown, the tank may be interconnected on one side of the shaft while on the other side of the shaft, the tank is divided into axially spaced, axial extents encompassing each disc, so that there is a space between said axial extents to allow a filter cake, formed on the filter, to drop between the spaced extents onto a removal means such as the conveyor 14.

Where prior disc filters had substantially planar sides defined by the filter material, the novel filter increases the area, as best shown in FIGS. 7, 3, 4 and 5, by providing a filter material 22 which is shaped to form radially extending ridges and valleys alternating circumferentially about the filter thus increasing the available filter area 50% to 150%.

This design and result may be effected in any of a large number of ways of which there is here described a preferred arrangement in more detail.

The rotating shaft 24 has circumferentially arranged bores corresponding to the number (here 8) of sectors of which the disc is to be constructed. At the location of each disc there is provided a strong, axially extending ring 27 fastened rigidly on the outside of the shaft, in any desired manner, and provided with a threaded bore 26e corresponding to each sector and to two lines of slidable holes 42, located between bores 28 for a purpose to be hereinafter specified.

Each sector comprises apertured metal layers 30 arranged on opposed axially spaced sides of the sector and encompassing, when viewed axially, substantially the area of the sector outside the hub. Each side of the sector is arranged in radially extending accordion folds and preferably opposed outwardly facing nodes in the opposed walls are supported relative to each other by spaced beads 32 of spot welding best shown in FIG. 4.

The apertured walls of the filter sector material support, are substantially self-supporting and the opposed apertured walls are preferably joined at their circumferentially located edges by an extent integrally connected to each member and, at the other end by free ends of the porous metal welded together. The porous metal may be of any one of a number of well known materials, having widely distributed, closely spaced, apertures, designed to support the filter cloth, and to allow passage of the filtrate therethrough under the impulsion of sub-atmospheric pressure.

The chamber defining structure composed of the porous walls just described, is terminated at its radially inner end by walls 61 sloping radially outward and away from the inner end of a pipe 36. The wall 61 is contoured so that its edges are contoured to conform to the accordian fold of the porous member 30 and are attached thereto by any convenient means such as welding. A plate 63 is designed to attach to wall 61 by any simple means, and to clamp the tied filter material therebetween.

Figure 8:

Pipe 36 extends radially inwardly as shown from the wall 61 to seat in the bore in ring 27 which registers with the outlet 26E of a bore 26. A sleeve 69 is provided to surround pipe 36 in its extent between plate 61 and ring 27. Sleeve 69 is provided at the radially inward end, with a plate 63 designed to clamp the filter material, tied as shown in FIG. 8, between itself and plate 61. Plate 63 may clamp the ends of the filter material in this way, due to the assembly methods to be described or may be attached to the plate 61 by any desired means, including bolts extending through that part of the filter bag material which is to be clamped. However it is preferred to have plate 63 unattached to plate 61. The radially inward end of sleeve 69 is provided with a plate 65 shaped to rest on ring 27 between the rows of holes 42. Plate 65 may preferably be attached to ring 27 by bolts mounted on and projecting outwardly from ring 27 to project through corresponding apertures in plate 65 with cooperating nuts, threaded on the bolt ends, clamping the plate 65 to ring 27. Using the bolts to attach the members 63-69-65 to the ring 27, the plate 63 although unattached to the plate 61, clamps the filter material therebetween when the sector is drawn inwardly on plate 27.

With sleeve 69 surrounding pipe 36 and plate 65 shaped to complement the curvature of ring 27 and resting thereon between wells 42, the member 65-69-63 may be retained in place without bolts, as shown.

The undulated apertured sections which support the filter material may be made of other materials than metal, for example, molded rubber, fibre glass, polypropylenes and other material, which will have suitable strength and resistance to the material being supported and which will be suitably apertured or slotted to allow passage of the filtrate passing through the filter media.

The filter material or filter cloth 22 constructed of material and of a texture well known to those skilled in the art is applied as a bag over the outside of the porous plates with the bottom of the bag laid over the outside of the sector, the body of the bag encompassing the sides and circumferential ends and the ends of the sector and the neck of the bag 22 tied inward of the inner end of the sector about the pipe 36. Rods 40 are provided to run the length of the sector, on the outside of the filter material 22, and along the valleys in the porous plate 30, so that they act to shape the bag by forcing it to conform to the defined valleys, while the bag is dimensioned to simultaneously be stretched relatively tightly over the ridges. Thus a rod 40 is provided corresponding to each valley in a sector and on each side thereof. Corresponding to each rod 40 is a well 42 on plate 27, and each rod 40 shaped to slide into such hole is provided with a stop nut 48, a short distance from the end to limit the inward movement of rod 40 into wells 42. Between the sectors, rods 46 are threaded into threaded holes in the ring, rods 46 and the adjacent corresponding holes are located between sectors. The outer end of each rod 46 is also threaded and provided with a holding bracket and threaded outer nut 48 which holds the holding bracket 50 in the rod. A peripheral plate or curved bracket 52 encompassing the arc of a sector is curved to overlie the outer ends of the rods 40 and is provided with a bore or well 53 to slidably receive each outer end of a rod 40. Thus each rod 40 is provided with a nut 54 adjacent the outer end and spaced therefrom, to limit the passage of the peripheral plate 52 inward over the rods 40. The outer plate 52 is provided with semi-circular cut-outs 56 removed to receive the sides of rods 46 at each end of the plate 52. With the sleeve 69 surrounding pipe 36, the plate 65 will already be resting on and conforming to the curvature of ring 27 with the wells 42 exposed on each side of plate 65. The plate 65 may be bolted or unbolted to ring 27 as previously discussed. With the filter material bag 22 tied over the sectored porous plates, the rods 40 are loosely inserted in the wells 42 of ring 27 and retained when their outer ends are received in the wells in bores 53. The ends of the plate are fitted with their semi-circular cut-outs 56 about rods 46 and the brackets 50 bear on the ends of peripheral plates 52 to retain the peripheral plates 52 in place when the nut 48 is tightened until the peripheral plates 52 press firmly on the outer nuts 54 on rods 40. The rods 40 in turn, are held firmly at their inner ends in wells 42. Plate 63, with the sleeve 69 surrounding the pipe 36 and the end of pipe 36 resting in bore 26E clamps the compressed filter material between itself and plate 61. The sector is thus assembled with the rods 40 maintaining the filter material 22 in its undulating contour as previously explained.

Figure 9:
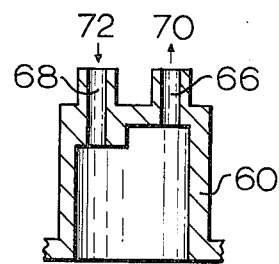
FIGS. 9 and 10 show details of the control for the vacuum suction and reverse blow in the device.
Figure 10:
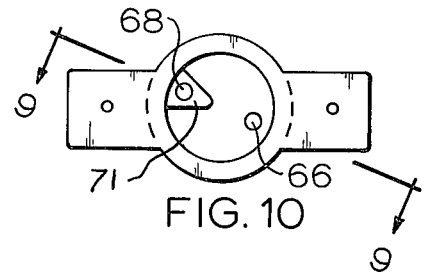

Mixed solids and liquids are supplied to the tank by means not shown. Means are provided for rotating the filter as schematically indicated. Withdrawal is achieved through subatmospheric pressure commonly referred to as a vacuum applied to the bores 26 thus providing a pressure gradient across the filter material and leading the filtrate through the filter material 22 along bores 26 to a receptacle for the filtrate. The arrangement of the right bores at the shaft end is as best shown in FIG. 2. Such shaft end is rotatably slidably received in cap 60, (FIGS. 9 and 10) which is mounted to be stationary. The cap 60 contains side walls to slidably receive the shaft 24 and a bottom wall including a raised portion on which the shaft end bears over 1/8 of its rotation (corresponding to the angular arc of a sector) here from about 9 to 10 o'clock looking to the left in FIG. 1. The remainder of the circumference of the cap acts as a well therefor with a port 66 connected to a vacuum source along line 70. High pressure is supplied along line 72 to a port 68 in the face of the raised, pie-shaped portion 71 of the bottom of cap 60. The port 68 is located to register with each of the ports 26E in the end of shaft 24. The coincidence of the ports and the magnitude of the air pressure supplied, which may be augmented by pressure control timing means if desired, should be arranged to produce an almost instantaneous short sharp blow rather than a sustained high pressure which might tend to bend rods 40. In operation therefore, filtrate and air is withdrawn from each sector during the rotation thereof (counterclockwise as viewed in FIG. 1) and during the period that the radially outward end of pipe 36 is submerged in the mixture of liquid and solid. At the point of registration of each port 26E with the high pressure port 68, high pressure air applied to the corresponding sector chamber, and with the help of a dilation of any loose portions of the filter material, loosens the filter cake which drops onto the conveyor 14 with the assistance of deflection plates 72 or end plates 76.

I claim:

1. A rotary vacuum disc filter comprising a plurality of filter sectors,
  wherein each sector is constructed to be assembled with similar sectors to form a generally circular disc, each said sector having a larger dimension in the radial direction than in the axial direction,
  said sector including a forming member on each side thereof,
  said forming members being spaced from each other in the axial direction,
  each said forming member being porous and shaped to form outwardly facing, radially extending ridges and valleys,
  flexible filter material shaped to be applied to radially outer portions of each side of said sector, on the outside of said forming members, and mounted on said sector,
  means causing the filter material so mounted to follow the ridges and valleys of the forming member to which it is applied,
  means including said filter material defining a chamber in said sector for receiving filtrate passing inwardly through said filter material,
  said sectors being assembled to form a generally circular filter,
  said circular filter being rotatably mounted to rotate about the axis of the circle of said filter,
  means for causing said filter to perform its filtering action in sectors which are partially submerged in a mixture of solids and liquids to be filtered,
  means operative during the partial submersion of each of said sectors to cause a pressure differential across the filter media due to the existence of atmospheric pressure on the outside of said filter media and the provision of subatmospheric pressure on the inside of said filter media,
  and means operative during a portion of the time when the sector is not partially submerged for directing a short sharp blow of high pressure air outwardly through said filter media for detaching accumulated filter cake from said filter media.

* * * * *